United States Patent Office 3,192,031
Patented June 29, 1965

3,192,031
COATED FERTILIZER COMPOSITIONS
Ralph Zaayenga, Media, Pa., assignor to Sun Oil Company, Philadelphia, Pa., a corporation of New Jersey
No Drawing. Filed June 21, 1962, Ser. No. 204,065
4 Claims. (Cl. 71—28)

This invention relates to coated fertilizer compositions having improved properties with respect to the rate at which the fertilizer is assimilated into the soil and to the method of preparing such compositions.

Nitrogen, potassium, and phosphorous are essential elements for plant growth and commercially available fertilizers for promotion of plant growth invariably comprise an organic or inorganic compound containing one or more of these elements. Some of the more frequently used compounds are ammonium nitrate, urea, ammonium sulfate, calcium cyanamide, sodium nitrate, potassium nitrate, ammonium phosphate, potash, and mixtures thereof. As a source of nitrogen, urea is a preferred fertilizer ingredient because it contains a higher nitrogen content than the other fertilizers mentioned.

Unfortunately, most of the compounds used in commercial fertilizers are readily water-soluble, and this creates a number of disadvantages. In a heavy rainfall, much of the fertilizer may be dissolved in the rainwater and soaked into the ground below the plant roots or rapidly transported away by flowing surface water. This fertilizer never becomes available to the plants. In addition, the readily soluble compounds often become available too rapidly to the plant resulting in injury to the plant rather than benefit. This is often noticed in "burned" lawns. Another disadvantage of the high fertilizer solubility is that the fertilizer has been consumed before the end of the growing season. Whether the fertilizer is soaked out of the reach of the plant roots or has been too rapidly absorbed by the plants, it frequently happens that all the fertilizer ingredients are gone at a time when the plant is still growing. The plants must then be refertilized in order to maintain optimum plant growth.

One method of reducing the rate at which the fertilizer is consumed is to coat the fertilizer particles with wax. A disadvantage of this approach is the fact that the wax content of the coated fertilizer must often be quite high in order to provide a satisfactory reduction in the rate at which the fertilizer is released to the plants. In areas of relatively heavy rainfall, wax contents of say 50% may be necessary; in areas of relatively little rainfall, wax contents of say 20–25% may be necessary. Such quantities of wax make the fertilizer quite expensive, hence a means of reducing the release rate without the use of excessive amounts of wax would be desirable.

A method has now been found by which the release rate of a wax coated fertilizer can be very substantially improved. The method comprises precoating the fertilizer particles with a finely divided inert material prior to applying the wax coating. Typical inert materials which can be used are diatomaceous earth, bentonite and other clays, calcium carbonate, asbestos, aluminum hydroxide, cupric oxide, ferric and ferrous hydroxide, talc, glass, and the like. Of these, diatomaceous earth is preferred.

By precoating the fertilizer particles, two important advantages are obtained. One, the release rate of the fertilizer for a given amount of wax is reduced. Secondly, the amount of wax required to achieve a given rate of release is reduced. This will be apparent in the following discussion. In the following discussion it is assumed that the fertilizer is urea and that the finely divided inert material is diatomaceous earth.

If particles of urea are dipped into molten wax and then removed and allowed to cool, a wax coated urea is obtained. Substantially all the particles of urea are surrounded by or encased in a thin film of wax. Stated otherwise, this procedure effects the incorporation of wax in urea. In order to determine the leaching properties of such a coated fertilizer, a number of the coated urea particles are placed in a beaker containing 200 cc. of water. Since the particles are heavier than water, they immediately sink to the bottom of the beaker. However, as the water slowly leaches the urea out of the coated particles, the density of the particles decreases and eventually they will rise to and float on the surface of the water. The time required for the particles to float, hereinafter referred to as the failure time, is a measure of the rate at which the urea is leached out of the coated particles by water.

The data presented in Table I shows the average failure time for wax coated urea particles prepared in the manner described hereinbefore. To obtain these data the coated particles were submerged in water and the failure time of each individual particle was observed. The average failure time shown in Table I is the average of all the individual failure times. The original composition of the coated particles was 80% urea-20% wax, the percentages being on a weight basis. The wax used was a petroleum paraffin wax having a melting point of 120° F. (ASTM D–87), a penetration of 18 at 77° F. and 105 at 100° F. (ASTM D–1321), and a viscosity of 38.8 S.U.S. at 210° F. (ASTM D–446).

Table I

| Composition | Average Failure Time, minutes |
|---|---|
| Urea-Wax | 14.0 |

If, however, the urea particles are precoated with a thin film of diatomaceous earth and then coated with wax in the manner described hereinbefore, the resulting particles have a significantly higher failure time, i.e., a lower release rate, than when coated with wax alone. The precoating can be effected in any convenient manner, such as by intimately mixing the urea particles and the diatomaceous earth. Upon such mixing a very small amount of diatomaceous earth adheres to the urea particles and results in what can be described as urea coated with a thin film of diatomaceous earth. Any diatomaceous earth which does not adhere to the urea is excess and is separated by, for example, placing the entire mixture on a sieve of about 100 mesh (Tyler Standard Screen) and shaking lightly. The diatomaceous earth coated urea particles are retained on the sieve while excess earth passes through the sieve and is recovered for subsequent use.

If the particles of urea coated with a thin film of diatomaceous earth are dipped into molten wax and removed and allowed to cool, a fertilizer is obtained which can be described as twice coated particles of urea. The first coating is diatomaceous earth and is adjacent to the urea; the second and outer coating is wax. The resulting fertilizer can also be described as diatomaceous earth coated urea particles, said coated particles being surrounded by or encased in wax. Alternatively, the resulting fertilizer can be described as wax coated urea containing a precoat of diatomaceous earth.

The data presented in Table II show the average failure time for wax coated urea containing a precoat of diatomaceous earth, both coatings being applied as hereinbefore described. The amount of diatomaceous earth which adhered to the urea was 0.5% of the weight of urea. The urea-diatomaceous earth content of the final compositions was 80%; the balance of the composition was wax. The urea and wax used were the same kind as was used to prepare the composition to which Table I refers. The diatomaceous earth used, known commercially as "Dicalite Speedflow" and manufactured by the Dicalite Corp., had a particle size of 100% through a 120 mesh Tyler Standard Screen and over 40% through a 325 mesh Tyler Standard Screen. The average failure time was determined in the manner hereinbefore described. The data of Table I is also included for ready comparison.

*Table II*

| Composition | Average Failure Time, minutes |
| --- | --- |
| Urea-Wax | 14.0 |
| Urea-Diatomaceous Earth-Wax | 20.4 |

It can be seen from these data that the precoat of diatomaceous earth has improved the fertilizer release rate by approximately 46%. Substantially the same results are obtained when other finely divided inert materials of the type hereinbefore described are used. Substantially the same results are also obtained when other fertilizer compounds of the type described hereinbefore are used.

It is not definitely known why the precoat improves the release rate of the wax coated fertilizer. The thin film of diatomaceous earth on the fertilizer particles imparts no water resistance itself. This is shown by several experiments. In one experiment particles of urea precoated with diatomaceous earth but not coated with wax were placed in one beaker of water and particles of urea not precoated or coated with any material were placed in another beaker of water. All particles dissolved almost immediately. In another experiment urea coated with wax alone was intimately mixed with diatomaceous earth, thus forming a diatomaceous earth coating on the outside of the wax coating rather than on the inside as is the case with the precoat. These particles were then subjected to the leaching test hereinbefore described. The average failure time was actually about 20% lower than the average failure time for urea coated with wax alone.

The finely divided inert materials which can be used for the precoat of this invention are defined as inert because they show substantially no chemical reaction with either solid fertilizer compounds or with wax. Examples of such materials have been given hereinbefore. They are defined as finely divided because for the purpose of this invention they have a particle size of 98–100% through a 120 mesh Tyler Standard Screen.

The coatings of the present invention can be applied not only to urea but to other solid fertilizers. Examples of those fertilizers most frequently used at the present time have been given hereinbefore. In addition, a mixture of solid fertilizers can be used. Thus where a soil is deficient in both potassium and nitrogen, it may be desirable to mix urea with potash and apply a precoat of diatomaceous earth and a coating of wax to the mixture. The particle size of the fertilizer is relatively unimportant except that the fertilizer particles should be larger than the particles of finely divided inert material, otherwise the inert material will be precoated with fertilizer rather than fertilizer precoated with inert material. This represents no serious obstacle, for commercial fertilizers are manufactured with a relatively large particle size in order to reduce such problems as dust losses during packaging and application and the like. Typical screen analyses of conventional fertilizers are 50–100%, usually about 80% retained on a 100 mesh Tyler Standard Screen and 98–100% retained on a 120 mesh Typer Standard Screen.

A broad range of waxes can be used in the composition and methods of the present invention. Particularly suitable waxes are those derived from petroleum, either paraffin or microcrystalline waxes. Such paraffin waxes will usually have melting points in the range of 110 to 165° F. (ASTM D–87), viscosities in the range of 30–50 S.U.S. at 210° F. (ASTM D–446), and penetrations in the range of 5–25 at 77° F. (ASTM D–1321). The microcrystalline waxes usually have a melting point in the range of 140–210° F. (ASTM D–127), viscosities in the range of 60–100 S.U.S. at 210° F. (ASTM D–446) and penetrations in the range of 5–25 at 77° F. (ASTM D–1321). Although they are less preferable, natural waxes of the animal, vegetable, or mineral type can be used, either alone or as mixtures with petroleum waxes. Examples of such natural waxes are beeswax, montan wax, candelilla wax, spermaceti wax, ozocerite wax, and carnauba wax.

The amount of each of the ingredients present in the compositions of this invention can vary over rather wide limits. The amount of finely divided inert material which adheres to the fertilizer particles will vary with the density of said inert material, the particle size of the fertilizer material, and the like. In addition, the release rate can be controlled to some extent by the amount of the inert material which is present on the surface of the fertilizer particle. For example, urea can be mixed with an excess of diatomaceous earth and a maximum amount of precoat will be obtained, and, for a given amount of wax, a minimum release rate will be obtained. On the other hand, if the urea is mixed with less than the maximum amount of diatomaceous earth which will adhere to the urea, there is then a shortage of diatomaceous earth and the release rate for the same amount of wax will be higher. For economic reasons, however, a lower release rate is preferably obtained by reducing the wax content rather than by reducing the amount of precoat.

The amount of wax will depend on the release rate desired which will in turn depend upon soil conditions, climatic conditions, the type of plants being fertilized, and the like. In general, release rates adequate for most use conditions will be obtained by a composition containing a major proportion of fertilizer based on total composition weight, 5–49% wax based on total composition weight, at least 0.1%, preferably at least 0.4%, finely divided inert materials based on weight of fertilizer. The maximum amount of finely divided inert material will depend upon the factors mentioned hereinbefore but will generally be less than 5%. In the appended claims the stated amounts of wax and fertilizer are based on total composition weight, the total composition being wax, fertilizer, and finely divided inert material. The stated amount of fertilizer is fertilizer per se and does not include the finely divided inert material. In addition, the stated amount of finely divided inert material in the appended claims is based on the weight of the fertilizer component.

Any convenient method can be used to apply the precoat or the wax coating of the present invention. One method of applying each has already been described. Alternatively, the wax coating can be applied by spraying the wax onto the precoated fertilizer particles in molten wax, or by dispersing the precoated fertilizer particles in molten wax, shaping the mass into pellets or granules in a mold, and cooling. In addition, excess earth can also be separated by air elutriation rather than by sieving.

I claim:

1. A fertilizer composition comprising solid, water-soluble fertilizer particles coated with a thin film of an essentially dry finely divided inert material having a particle size of 98–100% through 120 mesh, substantially all of said coated fertilizer particles being surrounded by and encased in a wax, said solid fertilizer being selected from the group consisting of ammonium nitrate, urea, ammonium sulfate, calcium cyanamide, sodium nitrate, potassium nitrate, ammonium phosphate, potash, and mixtures thereof, the proportions of the ingredients being as follows: fertilizer, a major proportion; wax, 5–49%; essentially dry finely divided inert material, 0.1 to 5.0% by weight based on the fertilizer component.

2. The composition of claim 1 in which the fertilizer is urea.

3. The composition of claim 1 in which the essentially dry finely divided inert material is diatomaceous earth.

4. The composition of claim 1 containing at least 0.4% essentially dry finely divided inert material.

References Cited by the Examiner

UNITED STATES PATENTS

| | | | |
|---|---|---|---|
| 847,749 | 3/07 | Ellis | 71—64 |
| 2,329,472 | 9/43 | Koontz | 99—169 |
| 2,399,987 | 5/46 | Cordie et al. | 71—64 |
| 2,698,815 | 1/55 | Bishop | 117—100 |
| 2,912,317 | 11/59 | Gloss | 71—64 |
| 2,936,226 | 5/60 | Kaufman et al. | 71—64 |
| 2,943,928 | 7/60 | Guth | 71—64 |
| 3,014,783 | 12/61 | Young | 71—64 |
| 3,024,098 | 3/62 | Austin et al. | 71—64 |
| 3,070,435 | 12/62 | Reusser et al. | 71—64 |

DONALL H. SYLVESTER, *Primary Examiner.*

ANTHONY SCIAMANNA, *Examiner.*